(12) United States Patent
Borkgren et al.

(10) Patent No.: US 9,648,801 B2
(45) Date of Patent: May 16, 2017

(54) AIR SEEDING CART AND MANIFOLD FOR SAME

(71) Applicant: Deere & Company, Moline, IL (US)

(72) Inventors: Stanley R. Borkgren, Geneseo, IL (US); Terry L. Snipes, East Moline, IL (US)

(73) Assignee: Deere & Company, Moline, IL (US)

( * ) Notice: Subject to any disclaimer, the term of this patent is extended or adjusted under 35 U.S.C. 154(b) by 61 days.

(21) Appl. No.: 14/870,544

(22) Filed: Sep. 30, 2015

(65) Prior Publication Data

US 2017/0086353 A1    Mar. 30, 2017

(51) Int. Cl.
| | |
|---|---|
| A01C 7/08 | (2006.01) |
| A01C 7/10 | (2006.01) |
| B65G 53/56 | (2006.01) |
| A01C 21/00 | (2006.01) |

(52) U.S. Cl.
CPC ............ *A01C 7/081* (2013.01); *A01C 21/005* (2013.01); *B65G 53/56* (2013.01)

(58) Field of Classification Search
CPC ........... A01C 7/08; A01C 7/084; A01C 7/081; A01C 15/04; A01C 15/06; A01C 21/005; B65G 53/50; B65G 53/56
USPC ......................................... 111/174–178, 186
See application file for complete search history.

(56) References Cited

U.S. PATENT DOCUMENTS

| | | | | |
|---|---|---|---|---|
| 3,253,863 | A * | 5/1966 | Hilliard .................. | B65G 53/56 406/183 |
| 6,192,813 | B1 | 2/2001 | Memory et al. | |
| 6,283,679 | B1 | 9/2001 | Gregor et al. | |
| 6,834,599 | B1 * | 12/2004 | Fuessel .................. | A01C 7/081 111/175 |
| 7,232,085 | B2 * | 6/2007 | DeHart ................. | F16K 11/072 241/264 |
| 8,434,416 | B2 * | 5/2013 | Kowalchuk ............ | A01C 7/126 111/178 |
| 9,363,942 | B2 * | 6/2016 | Bent ....................... | A01C 7/081 |
| 2015/0360881 | A1 * | 12/2015 | Roberge ................... | B60P 1/00 414/293 |
| 2016/0128270 | A1 * | 5/2016 | Ruppert .............. | A01M 9/0053 239/68 |

(Continued)

FOREIGN PATENT DOCUMENTS

DE          EP 0799560 A2 * 10/1997 ............. A01C 7/087

*Primary Examiner* — John G Weiss

(74) *Attorney, Agent, or Firm* — Michael Best & Friedrich LLP

(57) ABSTRACT

In a method of operating a seed cart, a compartment is provided defining a volume for receiving a commodity. A distribution manifold is provided including two sets of passages, the distribution manifold being associated with the compartment to selectively receive a commodity in one or both of the two sets of passages. A fan is operated to create an air stream. The air stream from the fan is divided into a plurality of primary tubes. An inlet divider plenum is provided having two outlets in communication with each one of the primary tubes. The flow of air from each of the plurality of primary tubes is divided amongst the two corresponding outlets with a corresponding movable vane within the inlet divider plenum such that an airflow ratio between the two sets of passages is controlled in response to the position of the vane.

20 Claims, 14 Drawing Sheets

(56) References Cited

U.S. PATENT DOCUMENTS

2016/0157419 A1\* 6/2016 Henry .................... A01C 7/084
 406/1

\* cited by examiner

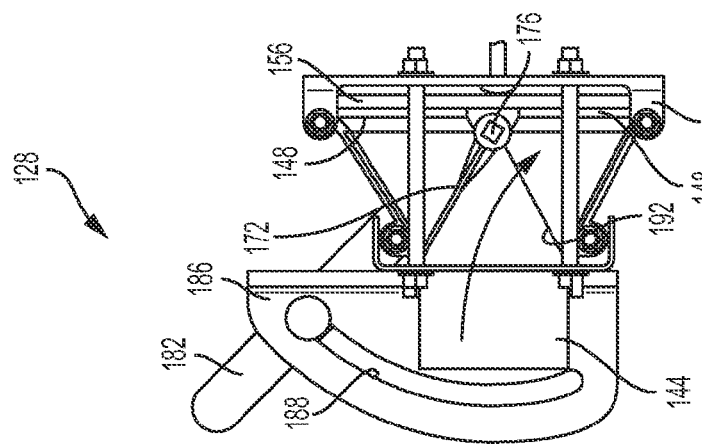
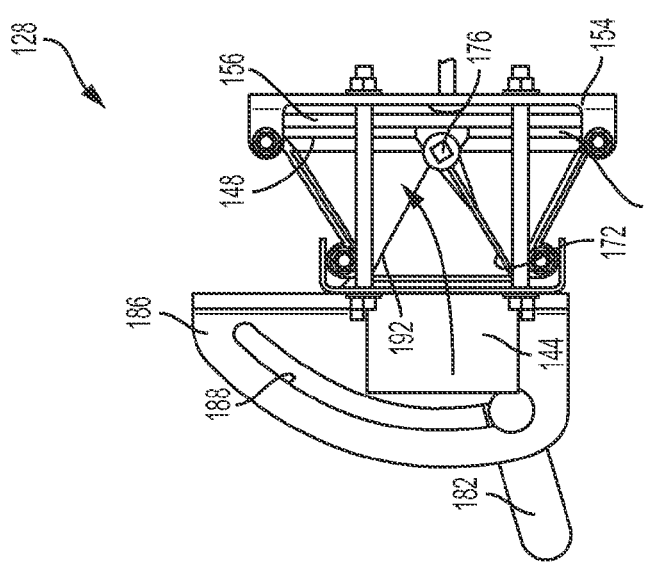
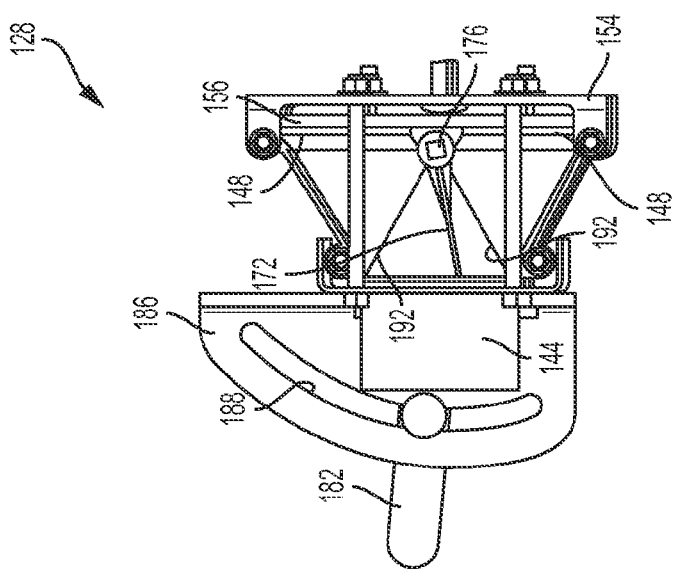

AIR SEEDING CART AND MANIFOLD FOR SAME

BACKGROUND

The disclosure relates to air seeders for agricultural use in planting crops. More particularly, the disclosure relates to a manifold construction of a seed cart.

SUMMARY

The disclosure provides, in one aspect, a seed cart for an air seeder. The seed cart includes a chassis adapted for attachment to an air seeding tool. First and second compartments are supported by the chassis, each of the first and second compartments defining a volume separate from the other for receiving a corresponding commodity. A fan is operable to create an air stream, and a set of primary tubes is coupled to the fan to receive separate portions of the air stream from the fan. First and second distribution manifolds are respectively associated with the first and second compartments such that the first distribution manifold is operable to selectively deliver the commodity of the first compartment to at least one set of two separate sets of passages within the first distribution manifold, and the second distribution manifold is operable to selectively deliver the commodity of the second compartment to at least one set of two separate sets of passages within the second distribution manifold. An inlet divider plenum has a plurality of inlets connected to corresponding ones of the set of primary tubes, and the inlet divider plenum has first and second outlets coupled to each one of the plurality of inlets such that the airflow received at each one of the plurality of inlets is variably divisible between the first outlet and the second outlet. Each first outlet is connected to a first set of the two separate sets of passages within the first distribution manifold and to a first set of the two separate sets of passages within the second distribution manifold. Each second outlet is connected to a second set of the two separate sets of passages in the first distribution manifold and to a second set of the two separate sets of passages within the second distribution manifold.

The disclosure provides, in another aspect, a method of operating a seed cart. The seed cart is provided. The seed cart is provided with a compartment defining a volume for receiving a commodity. A distribution manifold is provided including two sets of passages, the distribution manifold being associated with the compartment to selectively receive a commodity in one or both of the two sets of passages. A fan is operated to create an air stream. The air stream from the fan is divided into a plurality of primary tubes. An inlet divider plenum is provided having two outlets in communication with each one of the primary tubes. The flow of air from each of the plurality of primary tubes is divided amongst the two corresponding outlets with a movable vane within the inlet divider plenum such that an airflow ratio between the two sets of passages is controlled in response to the position of the vane.

The disclosure provides, in yet another aspect, a commodity distribution assembly for a seed cart. The commodity distribution assembly is provided with a distribution manifold having a first plurality of passages therethrough and a second plurality of passages therethrough; an inlet divider plenum having a plurality of inlets each in fluid communication with corresponding first and second outlets of the inlet divider plenum; and a plurality of vanes in the inlet divider plenum, each vane located between a respective inlet and corresponding first and second outlets of the inlet divider plenum. Each first outlet of the inlet divider plenum is in fluid communication with a respective passage of the first plurality of passages. Also, each second outlet of the inlet divider plenum is in fluid communication with a respective passage of the second plurality of passages.

Further aspects are set forth in the detailed description and accompanying drawings.

BRIEF DESCRIPTION OF THE DRAWINGS

FIG. 11 is a cross-section view of the inlet plenum, showing one of the divider vanes in a first position to divide an incoming air flow in a predetermined ratio between first and second rows of air passages.

FIG. 12 is a cross-section view of the inlet plenum, showing one of the divider vanes in a second position to direct an incoming air flow to only the first row of air passages.

FIG. 13 is a cross-section view of the inlet plenum, showing one of the divider vanes in a third position to direct an incoming air flow to only the second row of air passages.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
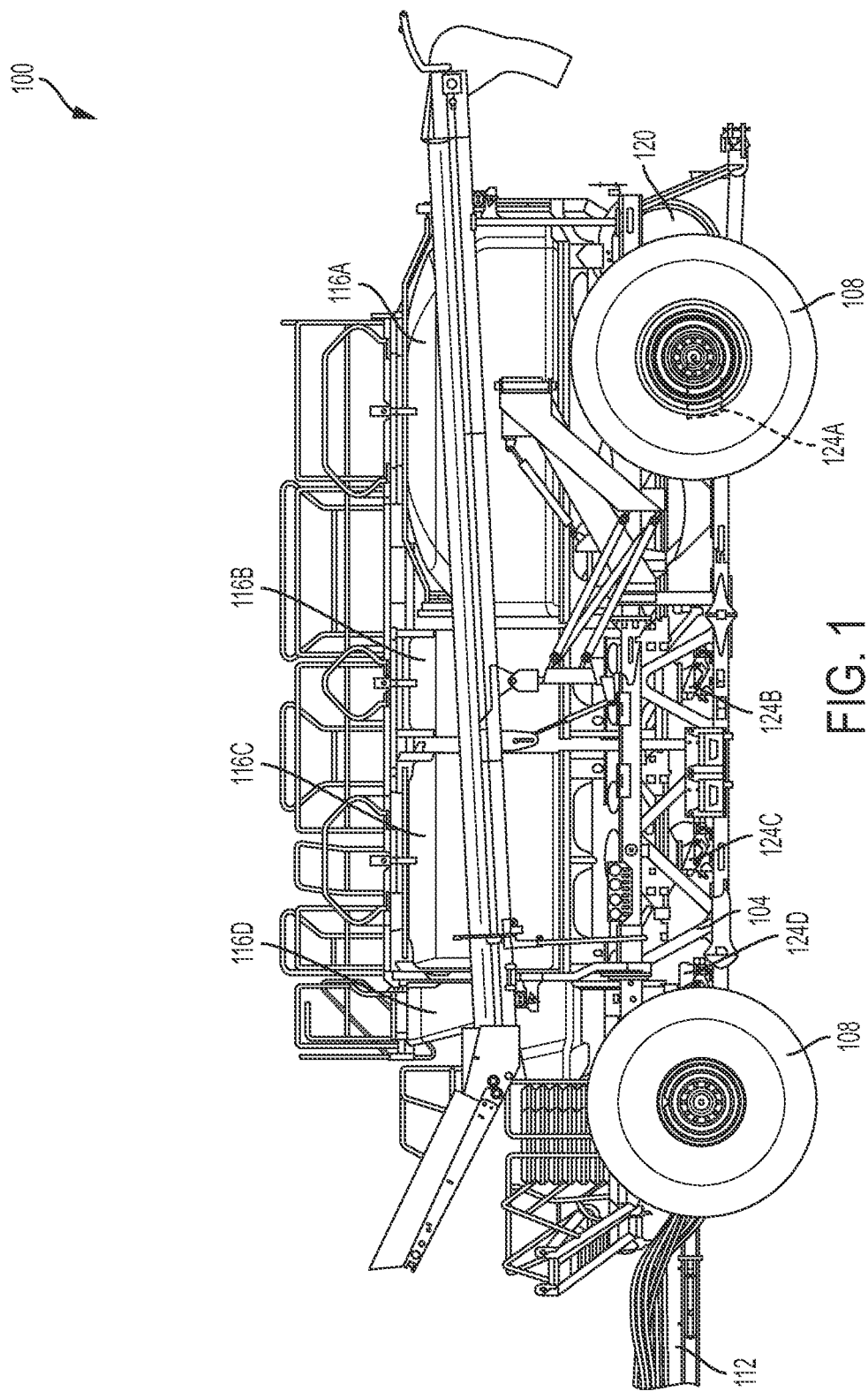
FIG. 1 is a left side view of a seed cart of an air seeder, according to one embodiment.
Figure 2:
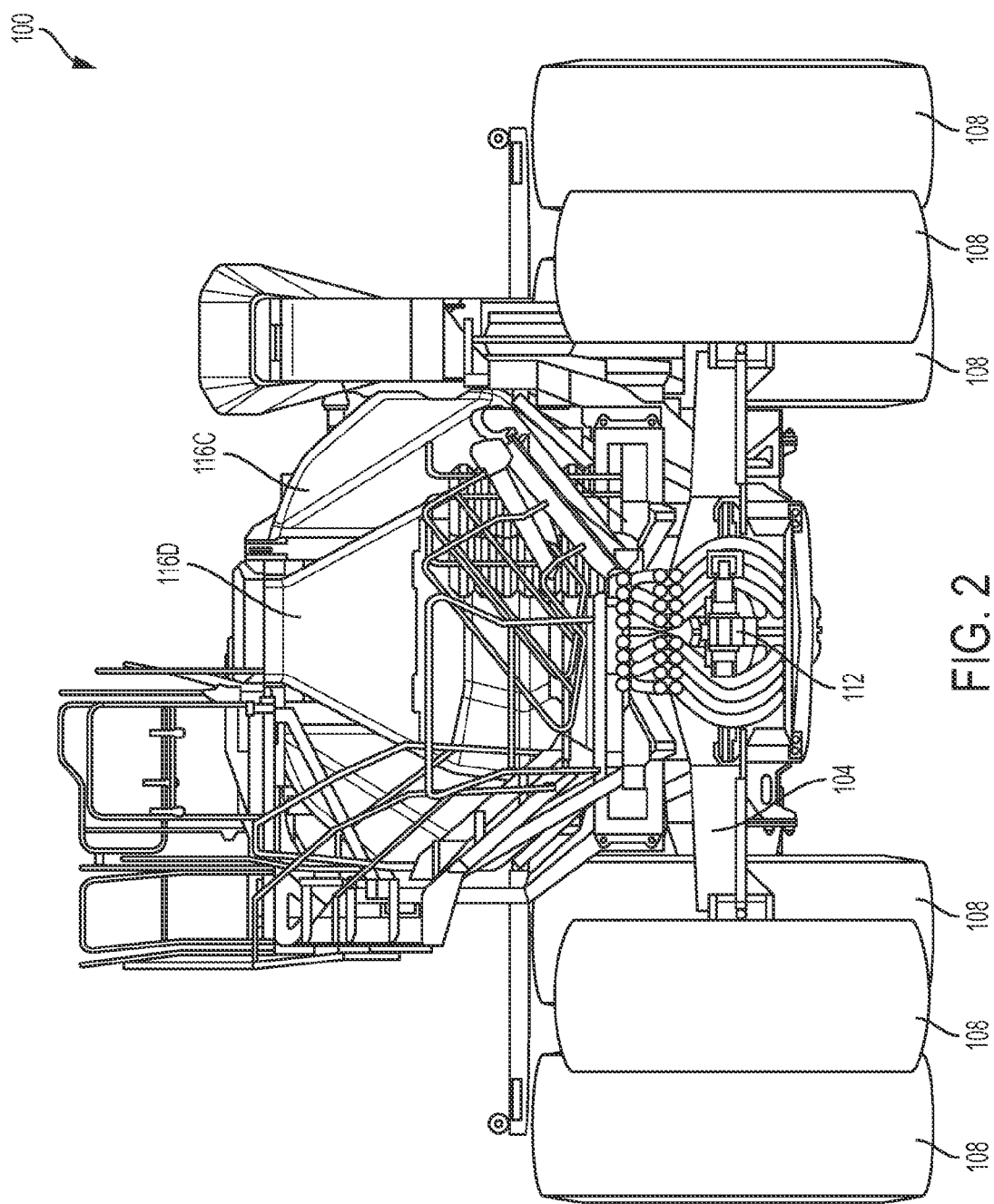
FIG. 2 is a front view of the seed cart of FIG. 1.
Figure 3:
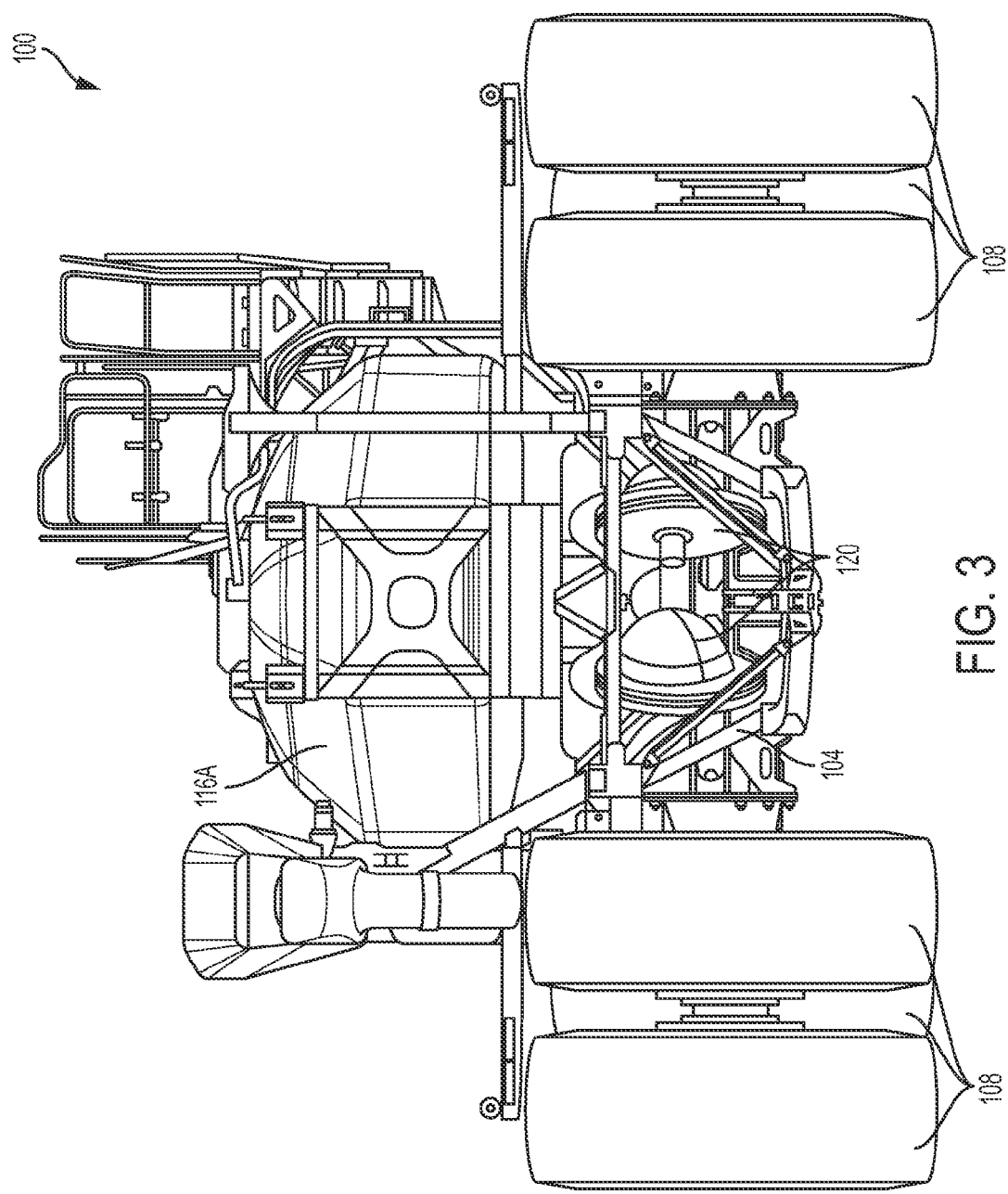
FIG. 3 is a rear view of the seed cart of FIG. 1.

A seed cart 100 of an air seeder is shown in FIGS. 1-3. The seed cart 100 includes a chassis 104 with wheels 108 to enable the seed cart 100 to roll along the ground in a field. Although not shown, the seed cart 100 is accompanied by a seeding tool such as a tilling implement that receives commodities (including for example fertilizer, seeds, and starter fertilizer) from the seed cart 100, and delivers the commodities to the ground. One example of a possible tilling implement is shown in U.S. Pat. No. 6,283,679, although other types may be substituted. Both the seed cart 100 and the corresponding tilling implement are pulled by a tractor (not shown). The seed cart 100 includes a coupler 112 on a forward or leading side thereof for connection to the tractor. The coupler 112 of the seed cart 100 can be connected directly to the tilling implement positioned between the tractor and the seed cart 100. In other constructions, the seed cart 100 may be connected to the tractor directly, with the tilling implement behind the seed cart 100. In any arrangement, the seed cart 100 stores quantities of the commodities and utilizes air flow through a plurality of primary air passages or "primaries" to deliver the commodities to the tilling implement. At the tilling implement, the primaries may be further divided at a dividing tower into a greater number of secondary delivery passages.

A plurality of tanks 116A-D are supported on the chassis 104, each of the tanks 116A-D defining a corresponding volume separate from the others for receiving a corresponding commodity. The sizes and shapes of the tanks 116A-D may vary from that shown, and the types of commodity put into each tank 116A-D may be selected by the user according to the intended planting and/or fertilizing operation. As shown, each of the tanks 116A-D is positioned at a unique location along the longitudinal direction, which is the direction of travel defined by the wheels 108. Each of the tanks 116A-D in the illustrated embodiment has a size and shape unlike each of the others, although other constructions may utilize one or more similar or identical tanks on the seed cart 100. In other constructions, a single tank with multiple, separate internal compartments may be used. First and second fans 120 are operable to create separate first and second air streams. Although the seed cart 100 can allow great flexibility in how the commodities are dispensed from the respective tanks 116A-D, the first and second air streams are independent from each other and are controlled in a precise manner as described in further detail below. A plurality of distribution manifolds 124A-D corresponding to the number of tanks 116A-D are provided on the seed cart 100, each distribution manifold 124A-D being arranged below a corresponding one of the tanks 116A-D and in communication therewith to receive and selectively distribute the commodity therefrom.

Figure 4:
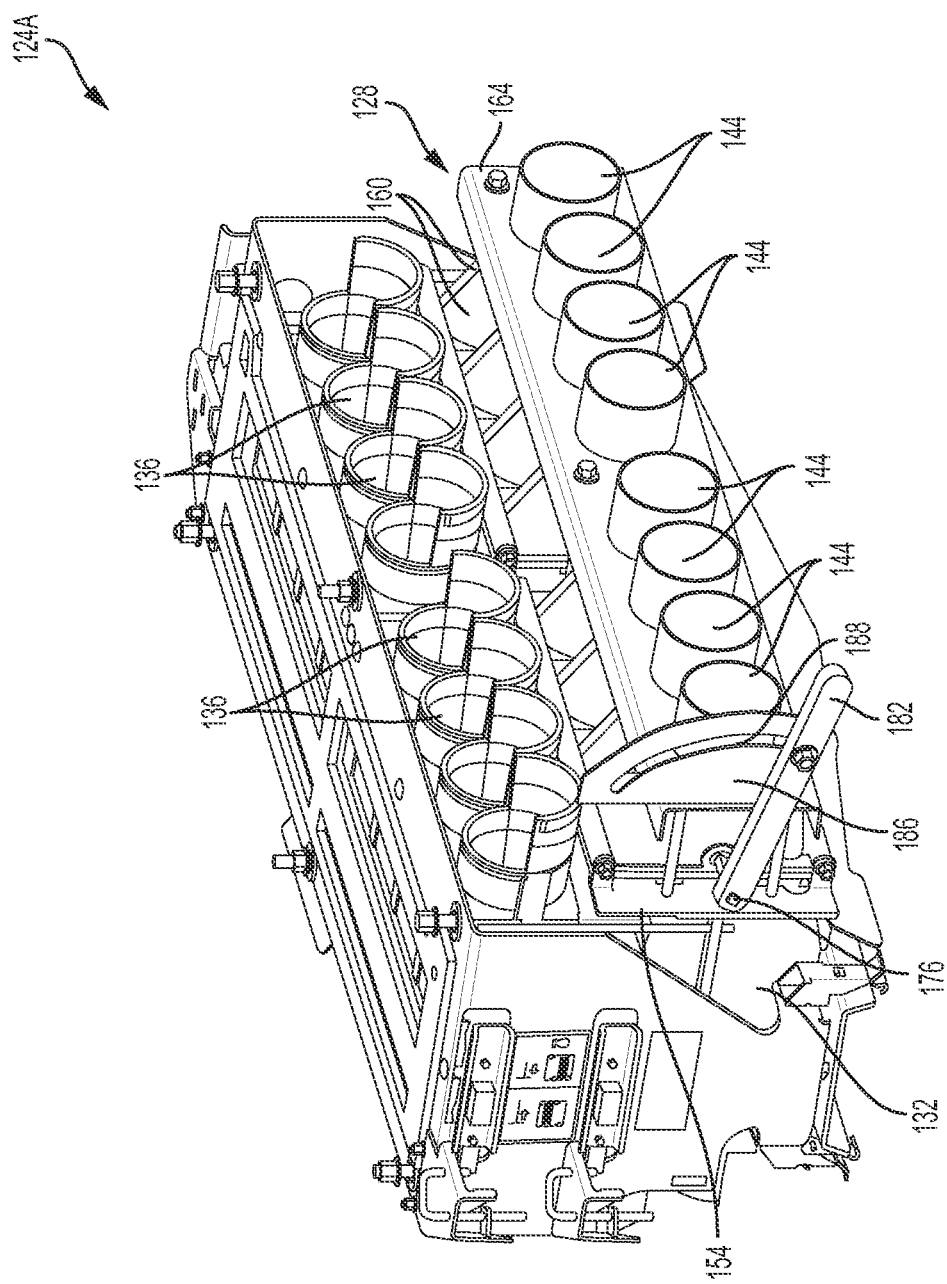
FIG. 4 is a perspective view of a primary air distribution manifold of the seed cart of FIG. 1, including an inlet plenum for dividing one row of air passages into two rows of air passages.

Each distribution manifold 124A-D includes multiple separate groups or sets of passages making up a portion of the primaries along the seed cart 100. The separate sets of passages can be provided as a separate ranks or rows. Each distribution manifold 124A-D can include an upper row of passages, a lower row of passages, and a middle row of passages between the upper row of passages and the lower row of passages. A first one of the distribution manifolds 124A (FIGS. 4 and 5) is positioned nearer the fans 120 than the other distribution manifolds 124B-D. The first distribution manifold 124A is the furthest upstream distribution manifold, and may receive the two air streams directly from the two fans 120. Each of the distribution manifolds 124A-D includes valves and corresponding venturis operable to selectively convey the commodity within the corresponding tank 116A-D to a selected one or more of the primaries (i.e., one or more of the three stacked rows of passages within the distribution manifold 124A-D). Each distribution manifold 124A-D may receive the commodity from the tank 116A through a corresponding product meter coupled therebetween. The product meter is operable to adjustably deliver the commodity according to a predetermined delivery rate. Details of an exemplary construction of such a product meter, along with the valves and venturis, can be found in U.S. Pat. No. 6,283,679. Outlets of each row of passages of the first distribution manifold 124A are coupled to inlets of the following distribution manifold 124B and so on, such that any given row of the primaries can selectively join any desired combination of commodities within the provided tanks 116A-D to the tilling implement for planting together. Typically although not necessarily, the upper row of primaries, including the upper row of passages of each of the distribution manifolds 124A-D, is used for the highest mass flow commodity delivery (e.g., fertilizer), while the middle and lower rows of primaries are used for lower mass flow commodity delivery (e.g., seeds and starter fertilizer).

In order to utilize the two fans 120 on the seed cart 100 for supplying three separate rows of primaries with three separate air streams, a first air stream generated by a first one of the fans 120 is provided to a first row of passages (e.g., upper row) in the first distribution manifold 124A, and a second air stream generated by the other fan 120 is provided to the remaining separate, adjacent rows of passages (e.g., middle and lower rows). The second air stream is split into two separate air streams by an inlet divider plenum 128 of the first distribution manifold 124A. The inlet divider plenum 128 divides the second air stream to supply the second and third rows of passages according to a predetermined ratio. The inlet divider plenum 128 is operable to variably divide the second air stream among the connected rows of passages to adjust the predetermined airflow ratio as described in further detail below.

Figure 5:
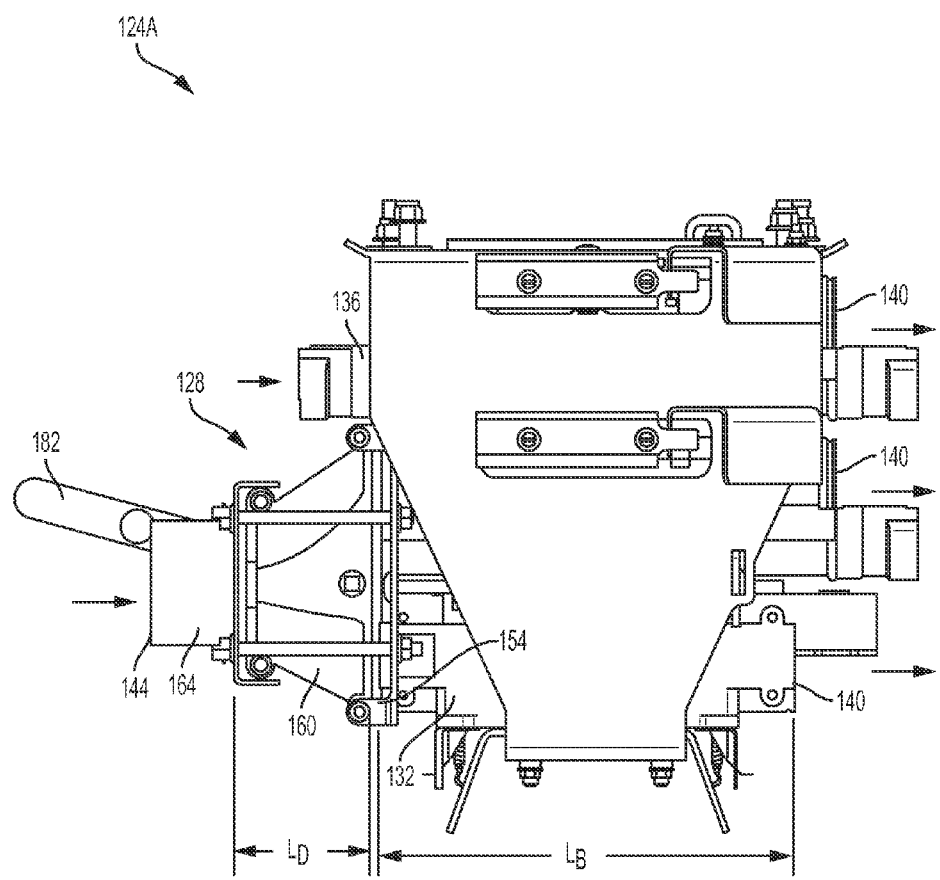
FIG. 5 is a side view of the primary air distribution manifold of FIG. 4.
Figure 6:
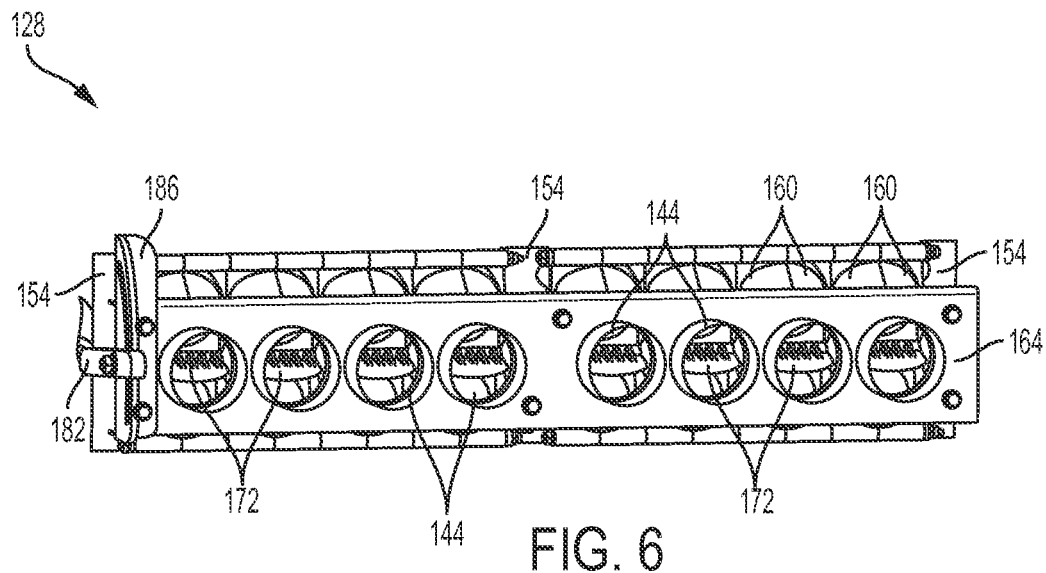
FIG. 6 is a perspective view of the inlet plenum.
Figure 14:
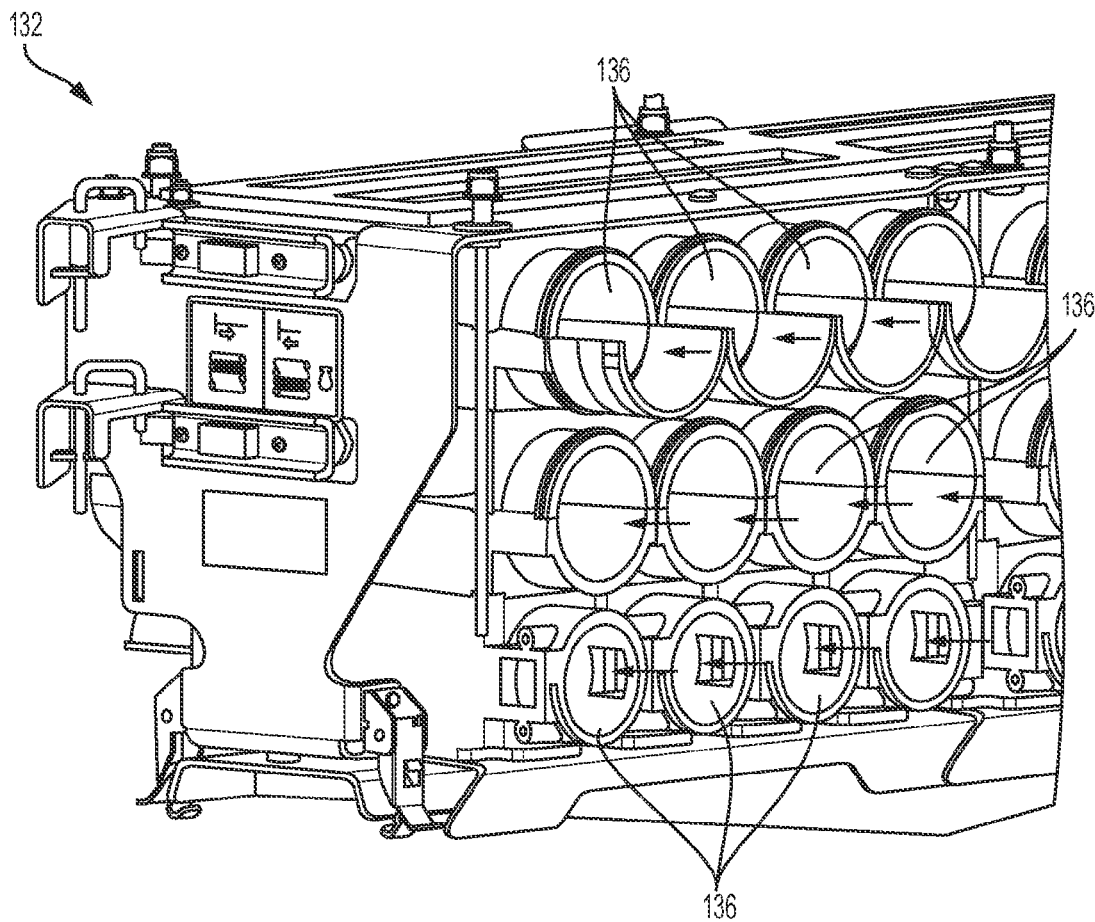
FIG. 14 is a perspective view showing the inlet side of the primary air distribution manifold of FIG. 4, with the inlet plenum removed.
Figure 15:
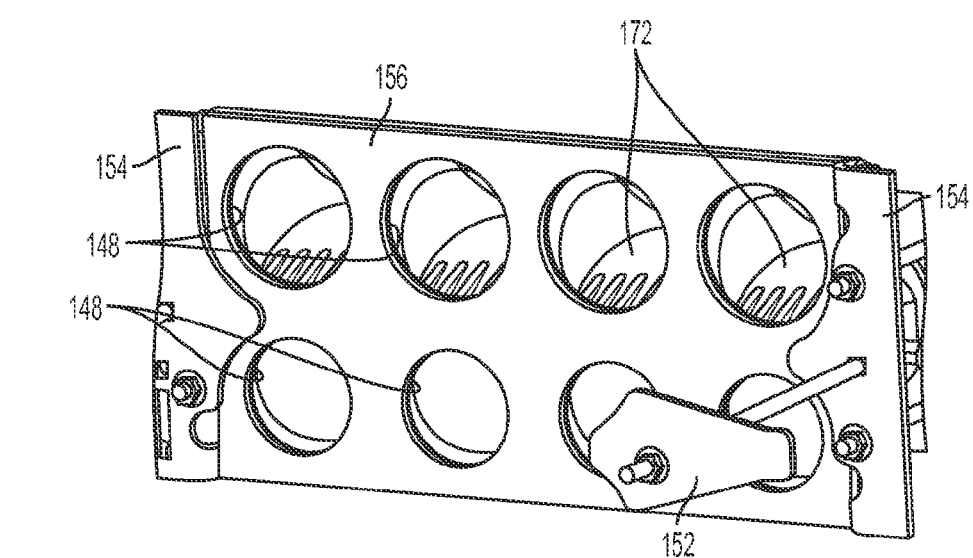
FIG. 15 is a perspective view showing the downstream sealing surface of a portion of the inlet plenum.
Figure 16:
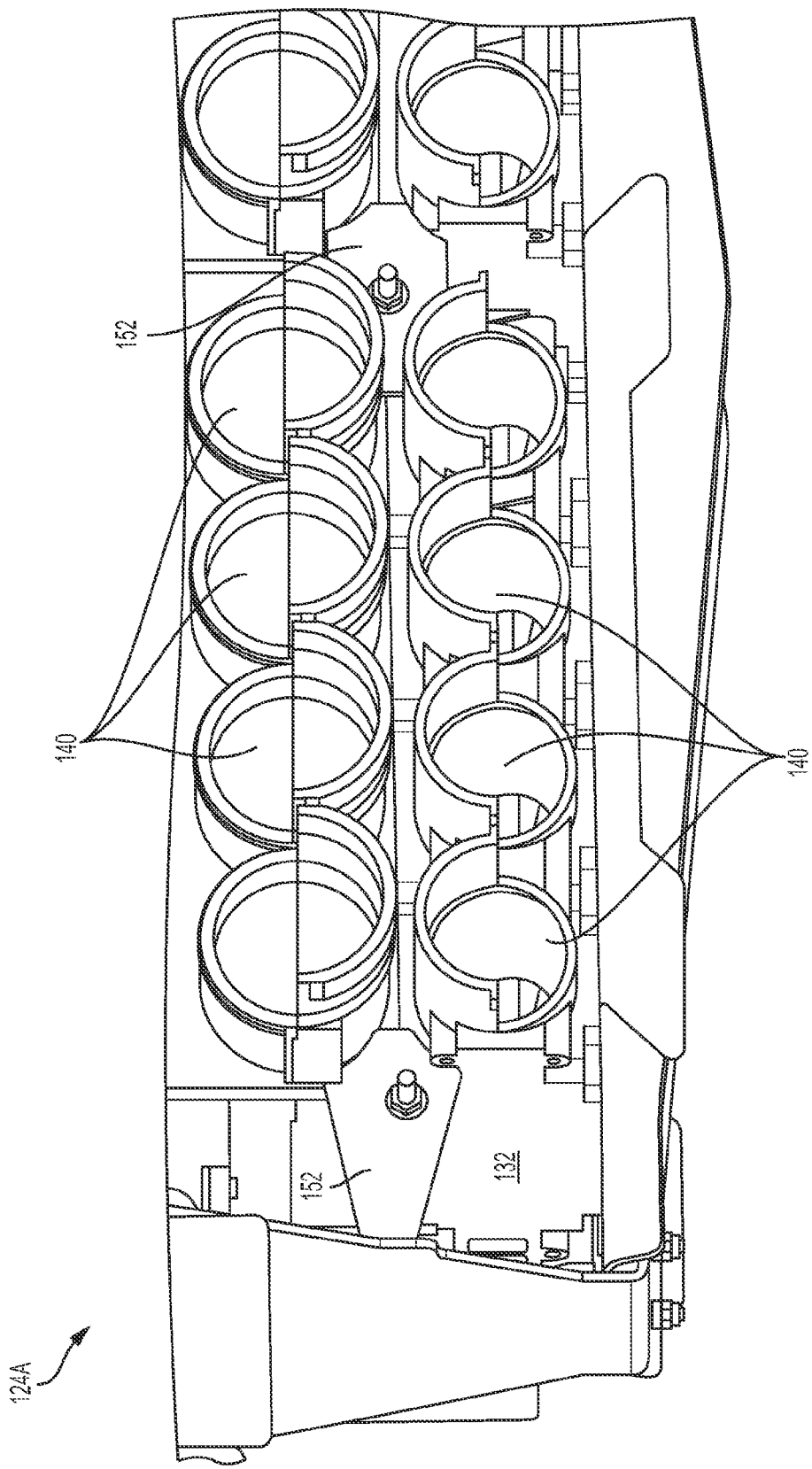
FIG. 16 is a perspective view of a portion of the outlet side of the primary air distribution manifold, showing attachment brackets of the inlet plenum.

The first distribution manifold 124A includes a body portion 132 through which all three rows of passages extend from respective inlets 136 (FIGS. 4, 5, and 14) to corresponding outlets 140 (FIGS. 5 and 16). Adapter couplings, otherwise referred to as tube support projections, may be provided at the various inlets 136 and outlets 140 of the body portion 132 for attaching respective pneumatic hoses, which in part establish the various rows of primaries. The inlet divider plenum 128 is coupled to the lower and middle rows of inlets 136 of the body portion 132. In some embodiments, tube support projections are removed or not otherwise provided at the inlets 136 (FIG. 14) that mate with the inlet divider plenum 128. The inlet divider plenum 128 includes a single row of inlets 144 and two rows of outlets 148 (FIG. 15) arranged in register with the lower and middle rows of inlets 136 of the body portion 132. The inlet divider plenum 128 can be secured to the body portion 132 with one or more fasteners. As shown, clamp plates 152 are coupled in spaced relationship with corresponding guide plates 154 of the inlet divider plenum 128 at both widthwise ends and at the center (see FIG. 8). The clamp plates 152 engage the body portion 132 on the outlet side, and are secured with conventional hardware (e.g., bolt, washer, and nut). A gasket 156 can be provided for sealing around all the separate air passages where the outlets 148 of the inlet divider plenum 128 mate with the inlets 136 of the body portion 132, whereby tightening of the fasteners engaged with the clamp plates 152 place the gasket 156 in compression. The outlet side of the inlet divider plenum 128 can also include ridges formed around each outlet 148 to concentrate the sealing force upon the gasket 156. The guide plates 154 keep the inlet divider plenum 128 aligned with the body portion 132 of the first distribution manifold 124A. It is noted in the illustrated embodiment that the inlet divider plenum 128 is secured directly to the body portion 132, with no additional flow-guiding structures or elements (e.g., hoses, pipes, or separate manifolds) therebetween. Thus, the inlet divider plenum 128 is integrated as part of the first distribution manifold 124A, and the flow division of the second fan 120 into two separate rows of passages occurs within the first distribution manifold 124A rather than in a separate structure divider structure spaced upstream. However, in other embodiments, the flow of one set of primaries may be split into separate sets of primaries at a location spaced upstream of the first distribution manifold 124A, by the inlet divider plenum 128 or another similar divider structure. Further, it is noted that the inlet divider plenum 128 may be provided downstream of the first distribution manifold 124A to split a set of primaries from the first distribution manifold 124A into two separate sets of primaries for flowing through another distribution manifold further downstream.

Figure 8:
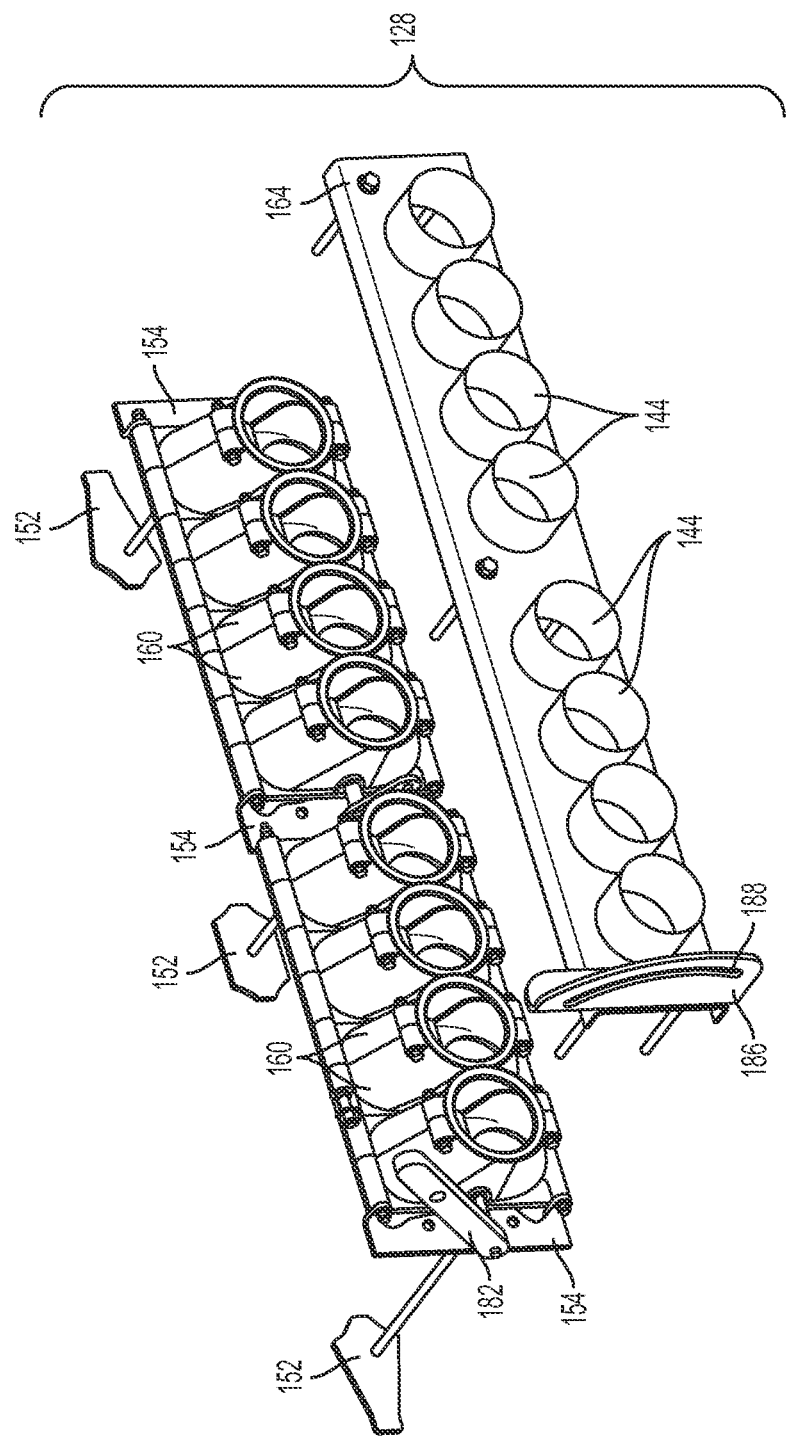
FIG. 8 is a partially exploded assembly view of the inlet plenum.
Figure 9:
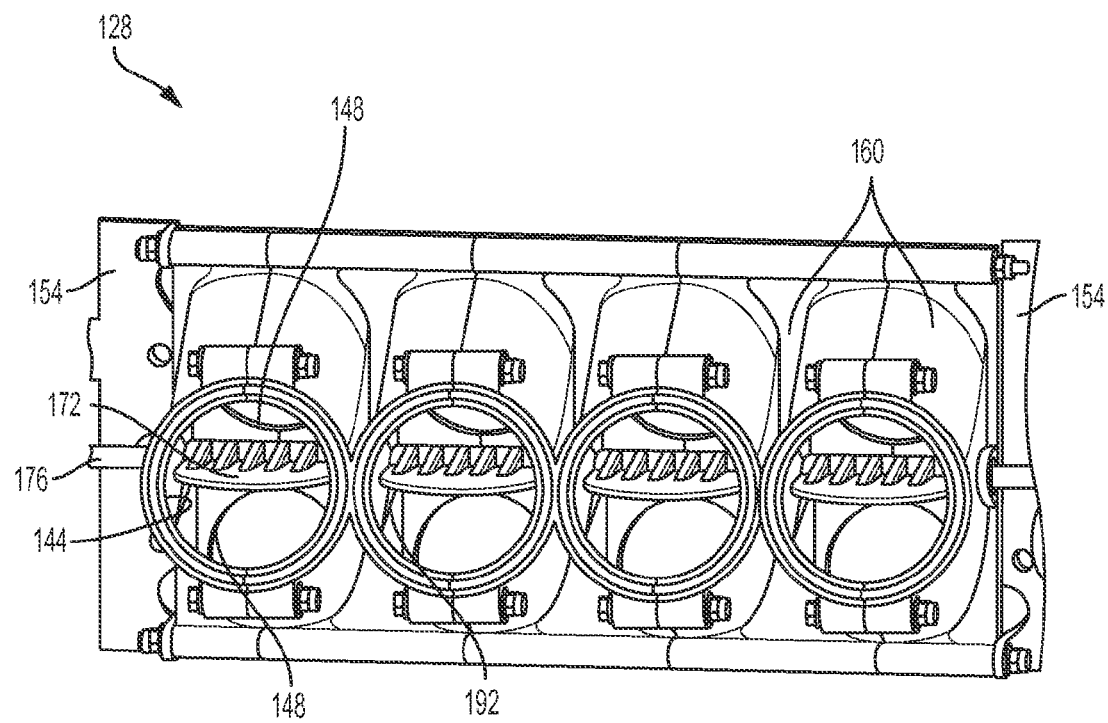
FIG. 9 is a perspective view of one half of the inlet plenum, showing internal divider vanes therein.

Although other constructions are possible, the inlet divider plenum 128 of the illustrated embodiment includes an individual wye housing made up of two symmetrical halves 160 in a clamshell-type construction for splitting each primary passage from the inlets 144. Each set of halves 160 may be formed with a tongue and groove joint therebetween, and said joint may also be provided with sealant (e.g., non-adhesive sealant) to aid in mitigating air loss. Each set of halves 160 may be secured together with multiple fasteners (e.g., bolts), such as along a direction perpendicular to the rows of passages as shown in FIGS. 8 and 9 of the illustrated embodiment. The inlets 144 are provided as part of an intake tube structure 164 (e.g., steel weldment) that is formed separately from the individual wye housing halves 160 and secured thereto via a plurality of fasteners (e.g., multiple bolts engaged between the intake tube structure 164 and each of the guide plates 154). Although a common intake tube structure 164 and several multi-part wye housings are described herein and illustrated in the accompanying figures, it will be appreciated that the intake tube structure 164 and remaining structure of the inlet divider plenum 128 can be constructed in any other manner desired.

Figure 10:
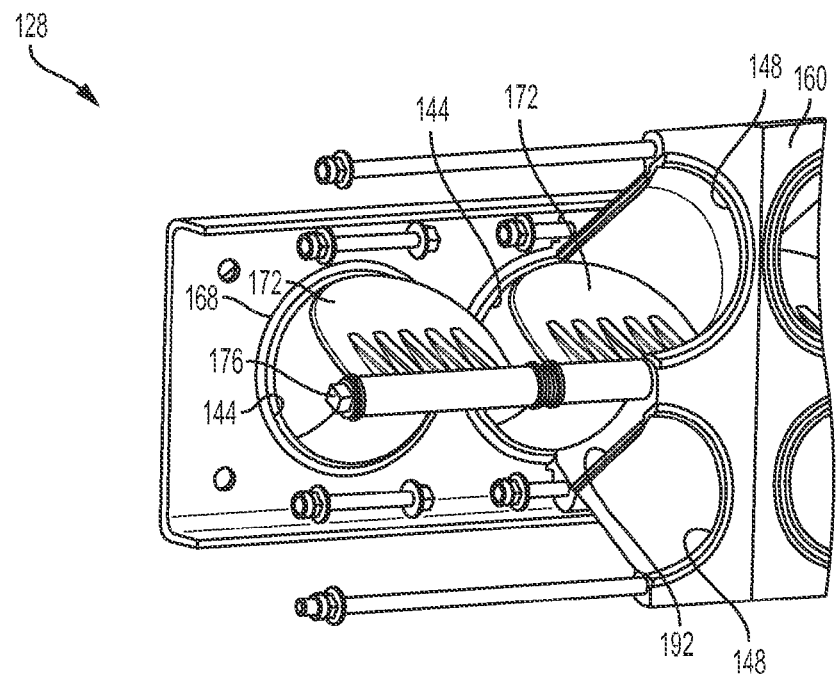
FIG. 10 is a partial cutaway view of a portion of the inlet plenum, showing the internal divider vanes in further detail.

With reference to FIG. 10 of the illustrated embodiment, an O-ring 168 may be provided at each interface between the intake tube structure 164 and the corresponding pair of wye housing halves 160. Two stacked outlets 148 (one of the middle row and one of the lower row beneath that of the middle row) of the inlet divider plenum 128 are formed by each individual wye housing, including the two halves 160. The two outlets 148 can be the same size or different sizes. For example, the outlet 148 of the middle row may have a larger diameter (e.g., 3 inches) than a diameter (e.g., 2.5 inches) of the outlet 148 of the lower row. In assembly, the inlet divider plenum 128 may be constructed by grouping the individual wye housings into two groups (e.g., two groups of 4 each as shown). In the illustrated embodiment, the first group of individual wye housings is secured with two rods between a center guide plate 154 and a corresponding end guide plate 154, while the second group of individual wye housings is secured with two additional rods between the center guide plate 154 and an opposite end guide plate 154 as shown in FIGS. 6-9.

Figure 21:
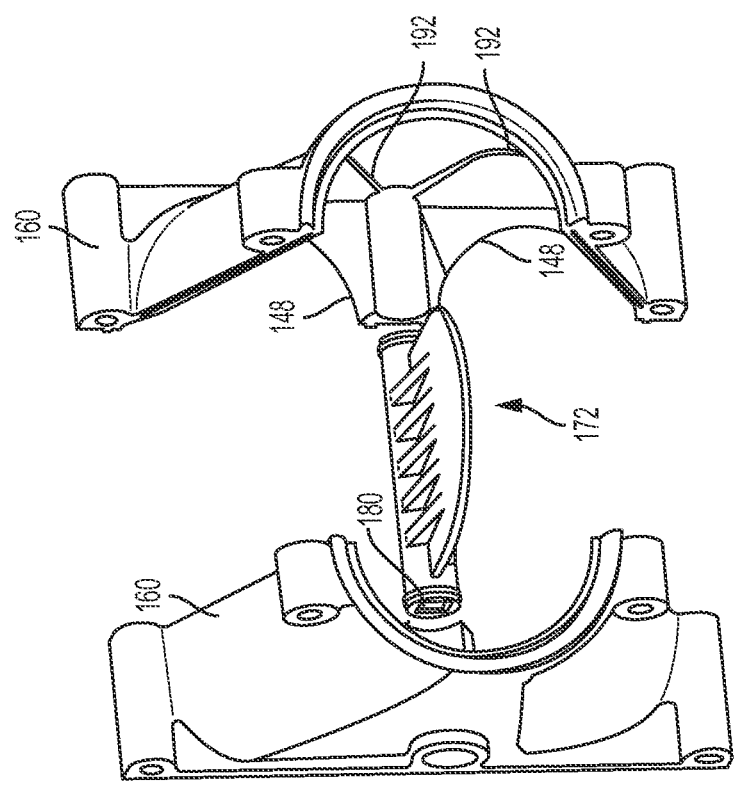
FIG. 21 is an exploded assembly view of the vane of FIGS. 19-20 and two housing halves of one divider section of the inlet plenum.
Figure 19:
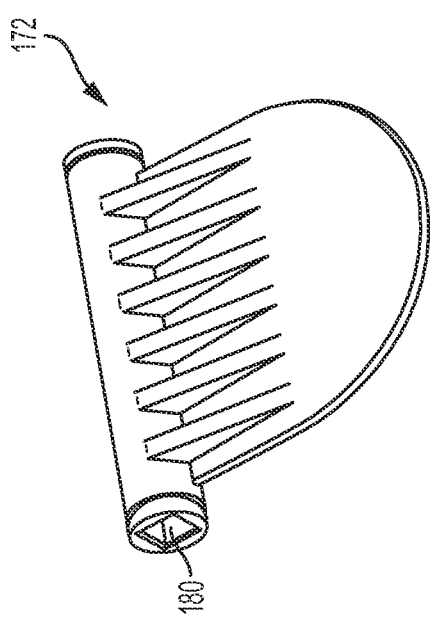
FIG. 19 is a perspective view of one of the vanes of the inlet plenum.
Figure 20:
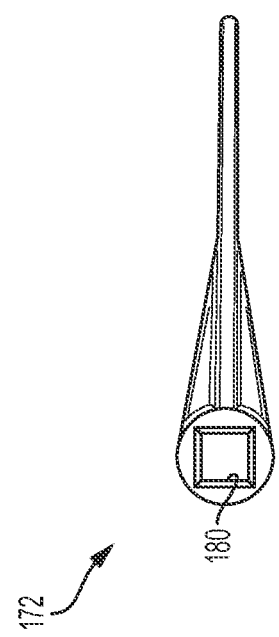
FIG. 20 is a side view of the vane of FIG. 19.

Movably received within each individual wye housing is a control vane 172, as shown in detail in FIGS. 19-21. The control vanes 172 can be molded plastic or another suitable material. The control vanes 172 for all or a portion of the inlet divider plenum 128 may be movable together as a unit about a common vane axis. In the illustrated embodiment, the vane axis is defined by one or more control rods 176 that are fixedly secured to the control vanes 172 to act as a drive shaft so that rotation of the control rod 176 drives rotation of all the coupled control vanes 172 synchronously. For example, the control rod 176 may have a non-circular cross-sectional shape (e.g., square), and each of the control vanes 172 can have a corresponding aperture 180 of non-circular cross-sectional shape to receive the control rod 176. The control rod 176 may be coupled to a handle lever 182 to enable manual adjustment of the angle of the control vanes 172 throughout the inlet divider plenum 128. A guide 186 for guiding movement of the handle lever 182 may be provided at an end portion of the intake tube structure 164, and may include an arcuate guide channel 188.

Figure 7:
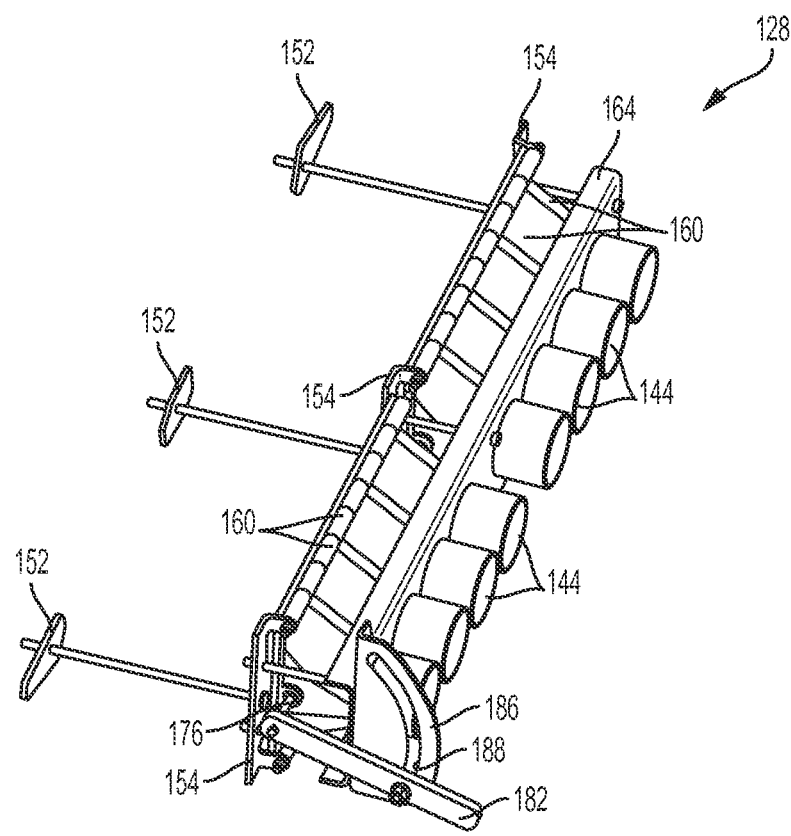
FIG. 7 is an alternate perspective view of the inlet plenum.

Each control vane 172 may have a flat paddle shape with stiffening ribs at the location of attachment to the control rod 176 (see FIGS. 7, 9, and 19). Opposite the end that attaches to the control rod 176, each control vane 172 has a curved edge, such as an edge defining a semi-circular profile. The curved edge, which is the free distal end of the control vane 172, can be oriented to face in the upstream direction toward the corresponding inlet 144. As particularly illustrated in FIGS. 11-13 and 21, each individual wye housing includes first and second stops 192 limiting adjustment of the corresponding control vane 172 therein. The control vanes 172 can be infinitely adjustable between the first and second stops 192. Each of the stops 192 can be formed as a ridge on an interior surface of the individual wye housing to make surface contact along all or a majority of the free edge of the control vane 172, although other stop shapes and sizes can instead be used. When the control vanes 172 are positioned against the lower stop 192 (FIG. 12), the lower row of outlets 148 are closed off, and all the air flow from the inlets 144 is directed to the upper row of outlets for supplying the middle row of passages in the body portion 132 of the first distribution manifold 124A. Likewise, when the control vanes 172 are positioned against the upper stop 192 (FIG. 13), the middle row of outlets 148 are closed off and all the air flow from the inlets 144 is directed to the bottom row of outlets 148 for supplying the lower row of passages in the body portion 132 of the first distribution manifold 124A. At any adjustment point between the upper and lower stops 192, air flow from the inlets 144 is divided in a predetermined ratio between the upper and lower rows of outlets 148. Thus, the control vanes 172 of the inlet divider plenum 128 control the air flow ratio between two adjacent rows of primaries (e.g., middle and lower rows of passages) throughout the primaries along the rest of the seed cart 100 (including each subsequent distribution manifold 124B-D) and into the tilling implement.

By splitting the output air flow of the second fan 120 with the inlet divider plenum 128 of the first distribution manifold 124A as described herein, equal length supply hoses between the second fan 120 and the first distribution manifold 124A can be used, and air flow splitting in the widthwise direction (i.e., outlets 148 horizontally oriented with respect to one another, rather than vertically oriented as shown in the illustrated embodiment) is avoided, as this can lead to uneven distribution in which centrally-located passages receive higher flow than outer passages due to more direct flow routes. The division of air flow from the second fan 120 into two separate rows or ranks of passages is also completed in a very short length along the flow direction. In the illustrated embodiment, each of the upper row of passages, the lower row of passages, and the middle row of passages extends through the body portion 132 of the first distribution manifold 124A parallel to a flow axis (FIGS. 5 and 14), and a dividing section of the inlet divider plenum 128 that divides the second air stream extends over a length $L_D$ that is less than half a length $L_B$ of the body portion 132 as measured parallel to the flow axes. The dividing section is formed by the individual wye housings, since the flow division begins downstream of the intake tube structure 164. The body length $L_B$ in FIG. 5 is not inclusive of localized projecting structures such as the tube support projections.

Figure 22:
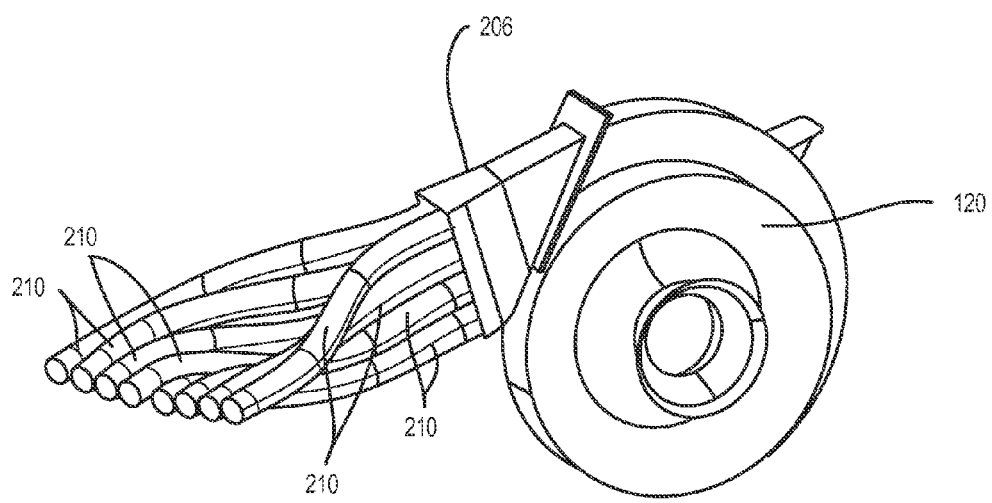
FIG. 22 is a perspective view of a fan and a plurality of primary tubes coupled to the fan through an outlet plenum.

The inlet divider plenum 128 provides an efficient way to utilize only the two fans 120 to enable the seed cart 100 to operate with three ranks or rows of passages (a so-called "triple shoot"). However, it is also noted that the disclosure may apply to a double shoot seed cart in which the primaries include only first and second separate rows of passages, both sourced by a single fan 120. In such an arrangement, the fan 120 produces an airflow that is divided into individual primary tubes, which then feed into the inlet divider plenum 128, which operates to divide the airflow of each primary tube into two separate airflows, one within the first row of passages and one within the second row of passages. FIG. 22 illustrates an exemplary fan 120 and fan outlet plenum 206, that may apply to either a double shoot or triple shoot seed cart. The outlet plenum 206 is arranged at the outlet of the fan 120. The outlet plenum 206 receives the airflow produced by operation of the fan 120 and includes a plurality of outlets, each coupled to a respective primary tube 210. The number of primary tubes 210 is half the number of separate primary passages within the seed cart supplied with air from the fan 120, since each of the primary tubes 210 is coupled to a respective inlet 144 of the inlet divider plenum 128. Regardless of the number of separate rows of primary passages within the seed cart, features of the disclosure allow the seed cart to operate by taking a single fan outlet, dividing it into a plurality of separate passages (e.g., a single row of primaries), and then subsequently dividing each of the plurality of separate passages into two passages at or upstream of a distribution manifold so that two separate rows of primary passages are created in two division steps from the fan 120. By utilizing the vanes 172 within the inlet divider plenum 128 after primaries have been established from the fan outlet plenum, a restrictor plate within the fan outlet plenum 206 for controlling the division of the airflow among primary groups can be eliminated and its associated drawbacks avoided.

Figure 17:
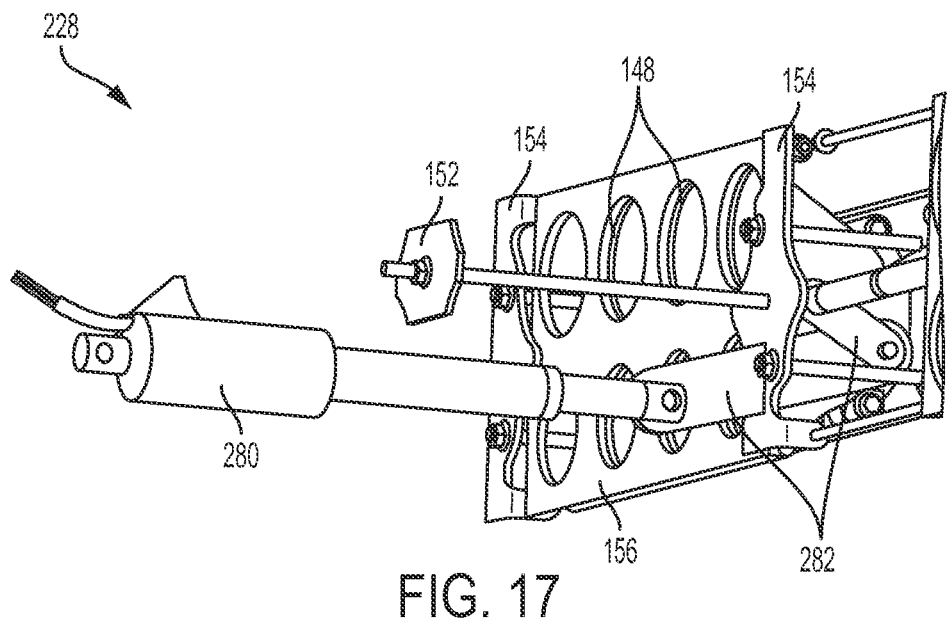
FIG. 17 is a perspective view of a portion of an inlet plenum, according to another embodiment.
Figure 18:
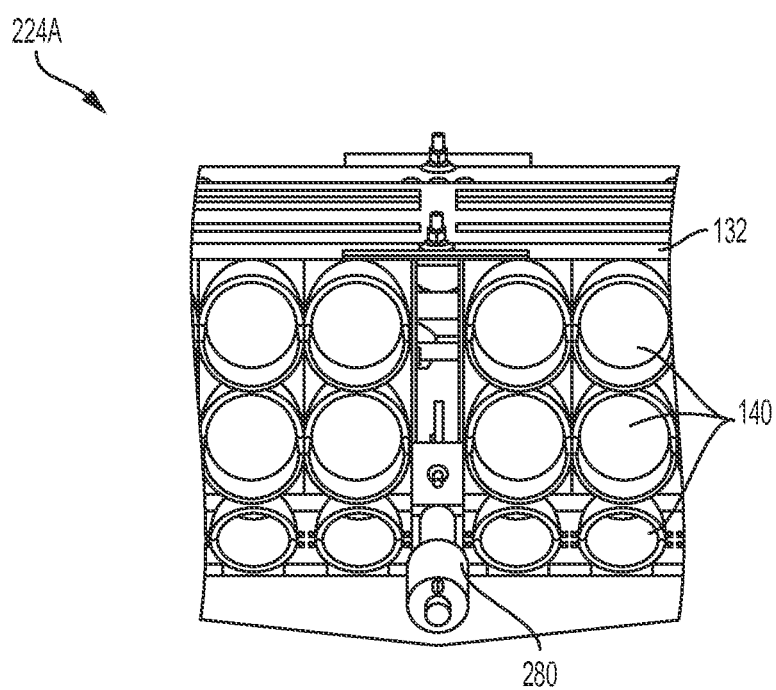
FIG. 18 illustrates a central section of the outlet side of the primary air distribution manifold having the inlet plenum of FIG. 17.

FIGS. 17 and 18 illustrate an alternate inlet divider plenum 228 of an alternate first distribution manifold 224A, that are similar to the inlet divider plenum 128 and the first distribution manifold 124A according to the preceding drawings and description, except as noted below. In lieu of the manually operable handle lever 182 to manipulate the control vanes 172, a powered actuator 280 is coupled to the control rod 176 for actuation of the control rod 176. As illustrated, the powered actuator 280 is a linear actuator that may be hydraulic, pneumatic, or electric (rather than actuated manually by an operator's hand). However, other types of powered actuators (e.g., those with a rotary output) may be provided in other embodiments. The powered actuator 280 can be coupled to the control rod 176 through one or more intermediate levers or links 282 as shown. However, the powered actuator 280 may directly couple with the control rod 176 in other embodiments. In the illustrated embodiment, the powered actuator 280 is located centrally in a widthwise direction of the first distribution manifold 224A such that half of the primaries are located to each lateral side of the control rod 176. As shown, the powered actuator 280 may be spaced downstream of the outlets 148 such that at least a portion of the powered actuator 280 extends through the body portion 132 of the first distribution manifold 224A. Although not shown together, the powered actuator 280 may be provided in conjunction with the manual handle lever 182 such that the operator can choose which input device to use, or the manual handle lever 182 can act as a back-up in the event of failure of the powered actuator 280. When the powered actuator 280 is utilized, an input signal to the powered actuator 280 may be generated by a controller in response to an operator selection via an input such as a menu displayed on a control screen, or direct manipulation of an input device such as a dial, knob, or lever.

Although the distribution manifolds 224A described herein and illustrated in the accompanying figures each have three rows of passages through which different airstreams pass, and although each row of passages is illustrated as being horizontal, it should be noted that this particular configuration is not required in all embodiments. Aspects of the present invention are applicable to distribution manifolds having less than three rows of passages (e.g., two rows of passages in fluid communication with a divider plenum 128 to split airflow to the two rows, or four or more rows of passages, any two of which can be provided with a divider plenum 128 for this purpose). In this regard, different embodiments of the seed cart 100 can have any number of tanks 116A-D and corresponding distribution manifolds 224A-D desired. In addition, the use of a divider plenum 128 that is on the distribution manifold and that has air inlets each with multiple outlets for splitting airflow (as discussed herein) is not limited to distribution manifolds having passages arranged in any particular form, such as in stacked rows as shown in the accompanying figures. The various embodiments of the divider plenum 128 discussed herein can be secured to distribution manifolds having any other passage arrangement desired while still providing some or all of the benefits of the embodiments described and illustrated herein.

Various features and advantages are set forth in the following claims.

What is claimed is:

1. A seed cart for an air seeder comprising:
   a chassis adapted for attachment to an air seeding tool;
   first and second compartments supported by the chassis, each of the first and second compartments defining a volume separate from the other for receiving a corresponding commodity;
   a fan operable to create an air stream;
   a set of primary tubes coupled to the fan to receive separate portions of the air stream from the fan;
   first and second distribution manifolds, respectively associated with the first and second compartments such that the first distribution manifold is operable to selectively deliver the commodity of the first compartment to at least one set of two separate sets of passages within the first distribution manifold, and the second distribution manifold is operable to selectively deliver the commodity of the second compartment to at least one set of two separate sets of passages within the second distribution manifold; and
   an inlet divider plenum having a plurality of inlets connected to corresponding ones of the set of primary tubes, the inlet divider plenum having first and second outlets coupled to each one of the plurality of inlets such that the airflow received at each one of the plurality of inlets is variably divisible between the first outlet and the second outlet, wherein each first outlet is connected to a first set of the two separate sets of passages within the first distribution manifold and to a first set of the two separate sets of passages within the second distribution manifold, and wherein each second outlet is connected to a second set of the two separate sets of passages in the first distribution manifold and to a second set of the two separate sets of passages within the second distribution manifold.

2. The seed cart of claim 1, wherein the inlet divider plenum includes a plurality of vanes, each of the plurality of vanes positioned between one of the plurality of inlets and the corresponding first and second outlets, and wherein each of the plurality of vanes is movable to variably divide the airflow received at the inlet between the first outlet and the second outlet.

3. The seed cart of claim 2, wherein all of the plurality of vanes are mounted to a common drive shaft for synchronized rotation of the plurality of vanes.

4. The seed cart of claim 2, wherein each of the plurality of vanes is movable between a first position in which the vane closes off a first one of the first and second outlets, and a second position in which the vane closes off the other of the first and second outlets.

5. The seed cart of claim 4, wherein the plurality of vanes are infinitely adjustable between the first and second positions.

6. The seed cart of claim 5, wherein the first distribution manifold includes a manual lever coupled to the plurality of vanes and operable to adjust the position of the plurality of vanes when moved.

7. The seed cart of claim 5, wherein the first distribution manifold includes a powered actuator coupled to the plurality of vanes and operable to adjust the position of the plurality of vanes when powered.

8. The seed cart of claim 2, wherein the first distribution manifold includes one or both of a manual lever and a powered actuator coupled to the plurality of vanes and operable to adjust the position of the plurality of vanes.

9. The seed cart of claim 1, further comprising an additional fan operable to create an additional air stream, wherein each of the first and second distribution manifolds includes a third set of passages, and the third sets of passages of the first and second distribution manifolds are connected to receive the additional air stream from the additional fan.

10. The seed cart of claim 9, wherein the third sets of passages are the topmost sets of passages of the first and second distribution manifolds.

11. The seed cart of claim 1, wherein the inlet divider plenum divides the air stream at an inlet of the first distribution manifold, which is nearer the fan than the second distribution manifold.

12. The seed cart of claim 11, wherein the inlet divider plenum is secured directly to a body of the first distribution manifold.

13. The seed cart of claim 12, wherein the inlet divider plenum includes a plurality of guide plates that align the inlet divider plenum relative to the body of the first distribution manifold, and wherein a plurality of fasteners extend between the plurality of guide plates and a plurality of clamp plates on an outlet side of the body to secure the inlet divider plenum to the body.

14. The seed cart of claim 12, wherein each of the sets of passages extending through the body of the first distribution manifold extends parallel to a flow axis, and wherein a dividing section of the inlet divider plenum that divides the second air stream extends over a length that is less than half a length of the body as measured parallel to the flow axis.

15. A method of operating a seed cart, the method comprising:
providing the seed cart with a compartment defining a volume for receiving a commodity;
providing a distribution manifold including two sets of passages, the distribution manifold being associated with the compartment to selectively receive a commodity in one or both of the two sets of passages;
operating a fan to create an air stream;
dividing the air stream from the fan into a plurality of primary tubes;
providing an inlet divider plenum having two outlets in communication with each one of the primary tubes; and
dividing the flow of air from each of the plurality of primary tubes amongst the two corresponding outlets with a corresponding movable vane within the inlet divider plenum such that an airflow ratio between the two sets of passages is controlled in response to the position of the vane.

16. The method of claim 15, further comprising providing at least one additional compartment for receiving at least one additional commodity, and providing at least one additional distribution manifold, the method further comprising operating an additional fan to create an additional air stream, wherein the additional air stream is supplied to corresponding sets of passages of the distribution manifold and the at least one additional distribution manifold without passing through the inlet divider plenum.

17. The method of claim 16, wherein the distribution manifold is a first distribution manifold that is nearest the fan, and vanes of the inlet divider plenum divide the flow of air from each of the plurality of primary tubes at an inlet of first distribution manifold, and the two sets of passages supplied with air through the inlet divider plenum are a bottom two rows of passages of the first distribution manifold.

18. The method of claim 15, further comprising moving the vane to a corresponding first limit position to close off one of the two corresponding outlets.

19. The method of claim 18, further comprising moving the vane to a corresponding second limit position to close off the other of the two corresponding outlets.

20. A commodity distribution assembly for a seed cart, the commodity distribution assembly comprising:
a distribution manifold having a first plurality of passages therethrough and a second plurality of passages therethrough;
an inlet divider plenum having a plurality of inlets each in fluid communication with corresponding first and second outlets of the inlet divider plenum; and
a plurality of vanes in the inlet divider plenum, each vane located between a respective inlet and corresponding first and second outlets of the inlet divider plenum,
wherein each first outlet of the inlet divider plenum is in fluid communication with a respective passage of the first plurality of passages, and
wherein each second outlet of the inlet divider plenum is in fluid communication with a respective passage of the second plurality of passages.

* * * * *